US009628013B2

(12) United States Patent
Boenke et al.

(10) Patent No.: US 9,628,013 B2
(45) Date of Patent: Apr. 18, 2017

(54) LINEAR DRIVE WITH CROSS-CONTROLLER VIBRATION DAMPING

(71) Applicant: Siemens Aktiengesellschaft, Munich (DE)

(72) Inventors: Daniel Boenke, Nuremberg (DE); Michael Jaentsch, Erlangen (DE); Stefan Kuenzel, Erlangen (DE); Carsten Spindler, Remptendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/941,211

(22) Filed: Nov. 13, 2015

(65) Prior Publication Data

US 2016/0141992 A1     May 19, 2016

(30) Foreign Application Priority Data

Nov. 18, 2014   (EP) ..................................... 14193654

(51) Int. Cl.

| | | |
|---|---|---|
| *H02P 21/05* | (2006.01) | |
| *H02K 41/03* | (2006.01) | |
| *H02P 21/00* | (2016.01) | |
| *H02P 6/00* | (2016.01) | |
| *H02P 25/06* | (2016.01) | |
| *B23Q 1/00* | (2006.01) | |

(52) U.S. Cl.
CPC ................ *H02P 21/05* (2013.01); *B23Q 1/00* (2013.01); *H02K 41/03* (2013.01); *H02P 6/006* (2013.01); *H02P 21/0003* (2013.01); *H02P 21/0035* (2013.01); *H02P 25/06* (2013.01)

(58) Field of Classification Search
CPC ..... H02K 41/03; H02P 21/0003; H02P 21/05; H02P 25/06; H02P 6/006
See application file for complete search history.

(56) References Cited

U.S. PATENT DOCUMENTS

| | | | |
|---|---|---|---|
| 2009/0021194 A1 | 1/2009 | Tonami et al. | |
| 2010/0044144 A1* | 2/2010 | Tajima ............... | B60G 17/0157 180/443 |
| 2013/0049660 A1* | 2/2013 | De Franciscis .......... | H02P 9/10 318/400.23 |
| 2014/0247003 A1 | 9/2014 | Yamasaki et al. | |

FOREIGN PATENT DOCUMENTS

| | | |
|---|---|---|
| DE | 195 19 238 | 1/1996 |
| DE | 100 08 602 | 7/2001 |
| DE | 101 50 318 | 4/2003 |
| DE | 101 50 319 | 5/2003 |
| WO | WO 2012/056844 | 5/2012 |

* cited by examiner

*Primary Examiner* — Shawki S Ismail
*Assistant Examiner* — Muhammad S Islam
(74) *Attorney, Agent, or Firm* — Cozen O'Connor (57) ABSTRACT

A control device, linear device, non-transitory computer readable medium and method by which optimal vibration damping can also be achieved in a simple manner when transferring a carrier from one segment to the next segment, where a primary part includes a plurality of sequentially consecutive segments that are each connected to a supply voltage via a respective converter, such that each of plurality of sequentially consecutive the segments receive respective currents of a three-phase system.

16 Claims, 8 Drawing Sheets

LINEAR DRIVE WITH CROSS-CONTROLLER VIBRATION DAMPING

BACKGROUND OF THE INVENTION

1. Field of the Invention

The present invention relates to a linear drive, a control device for a convertor, a computer program and a control method for a primary part of the linear drive.

2. Description of the Related Art

Various embodiments of control methods for linear drives are known. For example, "regulated operation" is particularly known. In regulated operation, the segments of a primary part of the linear drive receive a quadrature-axis component of current which is precisely sufficient to cause a movement of a respective carrier in a respective segment of the primary part. Here, the carrier has a number of secondary parts that are statically arranged within the respective carrier. Regulated operation is a prerequisite for DE 101 50 318 A1 and DE 101 50 319 C1, for example. Regulated operation is also a prerequisite for DE 10 008 602 A1. In particular, DE 10 008 602 A1 explains how a carrier can be transferred from segment to segment of the primary part in a simple manner.

An important aspect of regulated operation is that only one single carrier is ever allowed to be present in each segment of the primary part. Using regulated operation, it is therefore impossible to move more than one carrier within the same segment of the primary part. This also applies when transferring a carrier from one segment of the primary part to the next segment of the primary part. Here, neither of the segments concerned is allowed to contain another carrier.

Depending on the application, the restriction that only one single carrier is allowed to be present in a segment of the primary part may be a significant disadvantage. In applications for the packaging industry or in manufacturing equipment (e.g. machine tools), for example, efficiency could be significantly increased if it were possible to move trains, i.e., a sequence of closely following carriers.

So-called "controlled operation" for linear drives is also known. In the context of controlled operation, the segments receive a direct-axis component of current which is so dimensioned as to be sufficient to reliably cause the movement of the carrier that is situated in the respective segment. The quadrature-axis component of current is kept as small as possible, or is pre-controlled by specifying a corresponding desired value for the quadrature-axis component of current. By advancing the direct-axis component of current in accordance with the desired movement, the carriers follow the magnetic field produced by the direct-axis component of current in a similar way to the movement of the rotor of a synchronous machine. This operating mode allows a plurality of carriers to be moved simultaneously in each segment of the primary part. Therefore, a plurality of carriers may be present simultaneously in the respective segment of the primary part. In the context of controlled operation, often also referred to as "I/f operation" in practice, the carriers can however experience mechanical vibrations which are superimposed on the desired movement of the carriers. Damping of such vibrations is required in many cases. Possibilities for damping such vibrations are known per se. Reference is made to DE 195 19 238 A1 by way of example only. However, only insufficient damping of vibrations that occur when transferring a carrier from one segment to another segment is possible using conventional methods.

SUMMARY OF THE INVENTION

In view of the foregoing, it is therefore an object of the present invention to provide a way by which optimal vibration damping can also be achieved in a simple manner when transferring a carrier from one segment to the next segment.

This and other objects and advantages are achieved in accordance with the invention by providing a control method in which a respective control device determines a respective commutation angle as a sum of a respective basic commutation angle and a respective damping commutation angle plus a respective first correction value and/or a respective second correction value, the respective control device determines the respective damping commutation angle via a respective vibration damping block to which at least the respective desired value for the direct-axis component of voltage and/or the respective desired value for the quadrature-axis component of voltage are supplied, the respective control device receives the respective first correction value from the control device which controls the currently preceding segment and/or the respective second correction value from the control device which controls the currently succeeding segment, the respective control device determines a first and/or a second correction variable by means of the respective vibration damping block, and the respective control device transmits the respective first correction variable to the control device which controls the currently preceding segment and/or the respective second correction variable to the control device which controls the currently succeeding segment.

In accordance with the method of the invention, the primary part has a plurality of sequentially consecutive segments, where the each respective segment is connected to a supply voltage via a respective converter, such that the segments receive respective currents of a three-phase system. Here, a respective desired speed value is specified to a respective control device which controls the respective converter, where the respective control device updates a respective basic commutation angle on the basis of the respective desired speed value, the respective currents are captured and supplied to the respective control device. In addition, the respective control device determines a respective direct-axis component of current and a respective quadrature-axis component of current based on the respective currents and a respective commutation angle.

The respective direct-axis component of current and the respective quadrature-axis component of current relate to a secondary part of the linear drive, where the respective control device supplies a respective desired value for the quadrature-axis component of current and the respective quadrature-axis component of current to a respective regulator for the quadrature-axis component of current, which determines a respective quadrature-axis component of voltage therefrom.

The respective control device also supplies a respective desired value for the direct-axis component of current and the respective direct-axis component of current to a respective regulator for the direct-axis component of current, which determines a respective desired value for the direct-axis component of voltage therefrom.

In addition, the respective control device, based the respective desired value for the direct-axis component of voltage, the respective desired value for the quadrature-axis component of voltage and the respective commutation angle, determines characteristic data with respect to voltages of a three-phase voltage system that are to be output by the respective converter to the respective segment, and specifies these to the respective converter.

As a result of taking the respective damping commutation angle into consideration, the mechanical vibration of the carrier is damped to the extent that the effects of the mechanical vibration within the respective segment are captured. As a result of taking the respective first correction value into consideration, the mechanical vibration of the carrier is damped to the extent that the effects of the mechanical vibration within the currently preceding segment are captured. Similarly, as a result of taking the respective second correction value into consideration, the mechanical vibration of the carrier is damped to the extent that the effects of the mechanical vibration within the currently preceding segment are captured. In principle, it is sufficient here to take either the first or the second correction value into consideration. This also represents the rule. However, it is also, possible in principle to take both correction values into consideration.

Similarly, the determination of the first and the second correction variables by the respective control device allows the corresponding correction variables to be made available to the control device for the currently preceding segment and/or the control device for the currently succeeding segment, and taken into consideration there as correction values. In principle, it is again sufficient to determine either the first or the second correction variable. This also represents the rule. However, it is also possible in principle to determine both correction variables.

In a preferred embodiment of the present invention, the respective desired speed value is also supplied to the respective vibration damping block. Here, the respective vibration damping block takes the respective desired speed value into consideration when determining the respective damping commutation angle and the respective first and/or the respective second correction variable. The presently contemplated embodiment results in optimized damping of the mechanical vibration that is superimposed on the carriers.

The respective control device receives the respective currents in a current-regulator clock cycle and specifies the characteristic data, with respect to the voltages that are to be output by the respective converter to the respective segment, to the respective converter in the current-regulator clock cycle. The respective control device also receives the correction values in a communication clock cycle and transmits the correction variables in the communication clock cycle. The exchange of the correction values and the correction variables between the control devices therefore occurs in accordance with the communication clock cycle. The faster the communication clock cycle, the better the quality of the regulation. In the optimum case, the communication clock cycle is identical to the current-regulator clock cycle. Alternatively, the communication clock cycle may be a whole-number multiple of the current-regulator clock cycle.

It is possible for the respective control device to function as a slave of the control device that controls the currently preceding or the currently succeeding segment. Here, instead of the specification of the respective desired speed value and updating of the basic commutation angle, the respective control device receives the basic commutation angle from the control device that controls the currently preceding segment or from the control device that controls the currently succeeding segment.

In such cases, if the respective vibration damping block is to take the respective desired speed value into consideration when determining the respective damping commutation angle and the respective first and/or the respective second correction variable, the respective control device must derive the respective desired speed value from the received basic commutation angle, and the respective derived desired speed value must then be supplied to the respective vibration damping block.

The receipt of the basic commutation angle preferably occurs in the communication clock cycle.

In a further preferred embodiment, the respective desired value for the quadrature-axis component of current is also supplied to the respective vibration damping block. Here, the respective vibration damping block takes the respective desired value for the quadrature-axis component of current into consideration when determining the respective damping commutation angle and the respective first and/or the respective second correction variable. The respective desired value for the quadrature-axis component of current may be supplied to the respective vibration damping block as an alternative to the respective desired speed value. However, the respective desired value for the quadrature-axis component of current is preferably supplied to the respective vibration damping block in addition to the respective desired speed value.

The respective control device preferably takes into consideration, as appropriate, the extent to which the segments are coupled together. Two alternative embodiments may be used for this purpose.

Firstly, the respective control device can determine a first degree, to which a secondary part of the linear drive, said secondary part being situated partially in the respective segment, is situated in the currently preceding segment, and weight the respective first correction value by the first degree before summing, and/or the respective control device can determine a second degree, to which a secondary part of the linear drive, said secondary part being situated partially in the respective segment, is situated in the currently succeeding segment, and weight the respective second correction variable by the second degree before summing.

Secondly, the respective control device can determine a first degree, to which a secondary part of the linear drive, said secondary part being situated partially in the preceding segment, is situated in the respective segment, and take said first degree into consideration when determining the respective first correction variable, and/or the respective control device can determine a second degree, to which a secondary part of the linear drive, said secondary part being situated partially in the succeeding segment, is situated in the respective segment, and take the second degree into consideration when determining the respective second correction variable.

The respective control device may also be supplied with a respective desired acceleration value, and determine the respective desired value for the quadrature-axis component of current based on the respective desired acceleration value.

In principle, the control method in accordance with the disclosed embodiments of the invention may be used for any desired applications. In the preferred embodiment, the control method is used for transporting and positioning work carriers or conveyor elements.

It is also an object of the invention to provide a non-transitory computer readable medium encoded with a computer program comprising machine code which can be executed by a control device for a converter, wherein the execution of the machine code by the control device causes the control device to control the converter in accordance with the disclosed embodiments of the control method of the invention.

It is also an object of the present invention to provide a control device for a converter. In accordance with the invention, the control device is programmed by a computer program in accordance with the invention.

It is also an object of the invention to provide a linear drive, where a primary part of the linear drive has a plurality of sequentially consecutive segments, where each respective segment is connected to a supply voltage via a respective converter, such that the segments receive respective currents of a three-phase system, and each respective converter is controlled by a respective control device. In accordance with the invention, each control device is configured in accordance with the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The properties, features and advantages described above in respect of this invention, and the manner in which these are realized, become clearer and easier to understand in the context of the following description of the exemplary embodiments, these being explained in greater detail with reference to the drawings, in which.

DETAILED DESCRIPTION OF THE EXEMPLARY EMBODIMENTS

Figure 1:
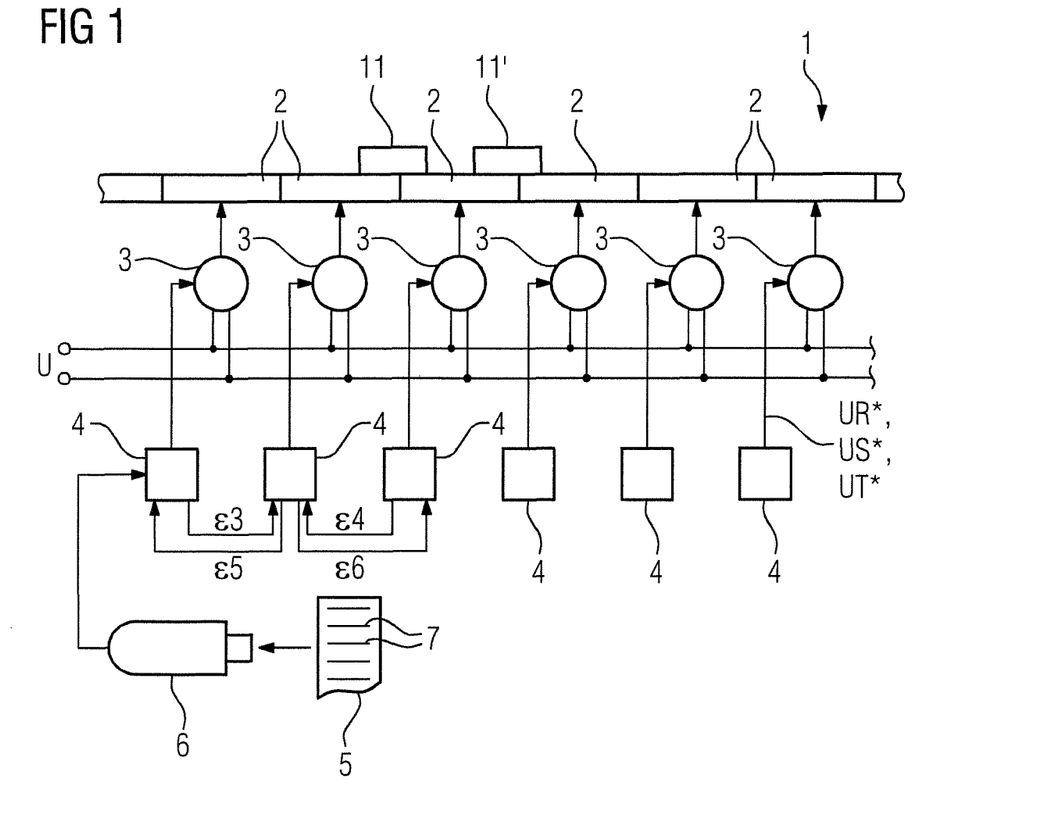
FIG. 1 schematically shows a linear drive.

With reference to FIG. 1, a linear drive has a primary part 1. The primary part 1 has a plurality of segments 2. The segments 2 are sequentially consecutive. The segments 2 are connected to a supply voltage U via a respective converter 3. The segments 2 therefore receive respective currents IR, IS, IT of a three-phase system.

The converters 3 are controlled by a respective control device 4. The converters 3 may be combined to form groups, where each group is controlled by a single microprocessor. One example of such a control system is the SINAMICS S120 of Siemens AG. In this system, up to six converters 3 may be controlled by a single controller (=control device within the meaning of the present invention). Whether the control devices 4 each control a single converter 3 or the converters 3 are combined to form groups is, however, of secondary importance in the context of the present invention. Of crucial importance is that, in a logical sense, each control device 4 activates the respective converter 3 individually and the respective converter 3 applies the respective currents IR, IS, IT to the respective segment 2 individually.

The control devices 4 are programmed by a computer program 5. Purely as an example, this is illustrated in FIG. 1 for one of the control devices 4. For example, the computer program 5 can be supplied to the control devices 4 via a data medium 6 (as an example, a USB memory stick is shown as a data medium 6 in FIG. 1). The computer program 5 comprises machine code 7 that is executable by the respective control device 4. The execution of the machine code 7 by the respective control device 4 causes the respective control device 4 to control the converter 3 it controls, in accordance with a control method which is explained in greater detail below in connection with the further figures.

Only one of the control devices 4 is explained in greater detail below in connection with FIGS. 2 and 3. The relevant explanations nonetheless also apply with respect to the further control devices 4. However, with the exception of the supply voltage U, which may be the same for all or some of the converters 3, the following explanations always relate individually to the single control device 4 concerned. Therefore, similar input variables may be supplied to other control devices 4. The other control devices 4 may also perform similar measures and output similar output variables. However, the respective actual values are individual to the respective control device 4.

Figure 2:
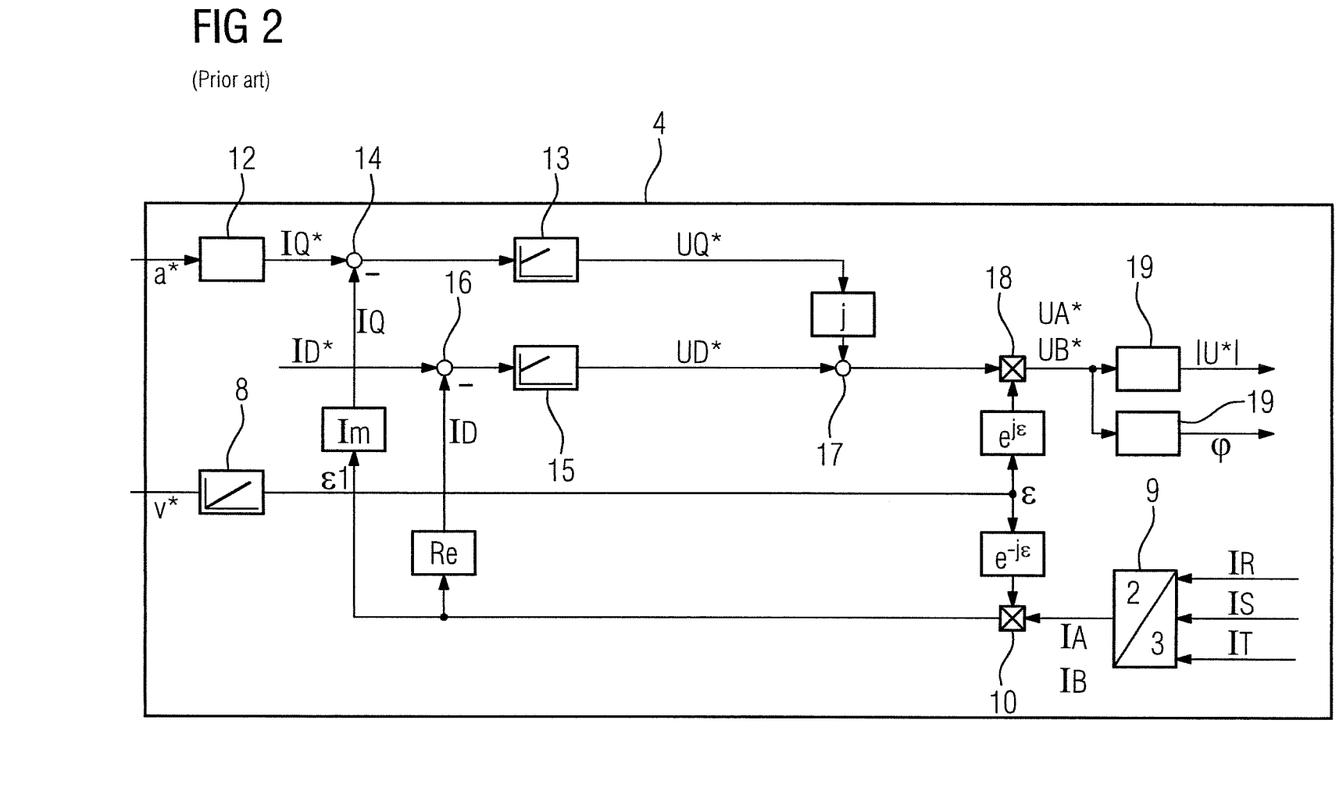
FIG. 2 schematically shows a control device for a segment of a primary part of a linear drive.

With reference to FIG. 2, a desired speed value v* is specified to the control device 4. The specification of the desired speed value v* normally occurs in a control clock cycle. The control clock cycle may lie in the range between 500 μs and 16 ms, for example. The desired speed value v* is supplied to an integrator 8. By means of the integrator 8, the control device 4 updates a basic commutation angle $\epsilon 1$ based on the desired speed value v*.

In the context of the embodiment depicted in FIG. 2, the basic commutation angle $\epsilon 1$ corresponds at the same time to a commutation angle $\epsilon$. In anticipation of the subsequent explanations relating to FIGS. 3 and 4, a distinction is, however, made between the basic commutation angle $\epsilon 1$ and the commutation angle $\epsilon$ in the following.

Using corresponding sensors, the currents IR, IS, IT of the three-phase system for the converter 3 that is controlled by the control device 4 are also captured and supplied to the control device 4. The control device 4 receives the currents IR, IS, IT in a current-regulator clock cycle. The current-regulator clock cycle is considerably shorter than the control clock cycle. The current-regulator clock cycle may lie in the range between 31.25 μs and 250 μs, for example, in particular at 62.5 μs or 125 μs. The captured currents IR, IS and IT are supplied to a determination block 9. They are then converted into orthogonal current components IA, IB by the determination block 9. The current components IA, IB relate to the respective segment 2 or the respective converter 3. The conversion is generally known and familiar to a person skilled in the art.

Based on the orthogonal current components IA, IB and the commutation angle c, the control device 4 determines a direct-axis component of current ID and a quadrature-axis component of current IQ. For this purpose, the orthogonal current components IA, IB are combined to form a complex variable (current space vector) and supplied in this form to a multiplier 10. The current component IA corresponds to the real part of the complex variable, the current component IB to the imaginary part of the complex variable. The complex variable $e^{-j\epsilon}$ is also supplied to the multiplier 10.

The multiplier 10 performs the (complex) multiplication. The result of the complex multiplication is a further complex variable, whose real and imaginary parts correspond to the direct-axis component of current ID and the quadrature-axis component of current IQ. Therefore, the two currents ID, IQ are likewise orthogonal to each other. However, they relate to a secondary part 11 (see FIG. 1) of the linear drive. This conversion likewise is known and familiar to a person skilled in the art.

In the context of controlled operation, the determined currents ID, IQ strictly speaking do not necessarily actually correspond to the real currents relating to the secondary part 11. In order to allow a precise calculation, the position of the secondary part 11 would have to be known relative to the segment 2. However, this is not the case. In practice, however, the procedure explained above results in correct operation of the linear drive.

The secondary part 11 interacts with the segment 2. In particular, the secondary part 11 can move relative to the segment 2.

The control device 4 supplies a desired value for the quadrature-axis component of current IQ* and the quadrature-axis component of current IQ to a regulator for the quadrature-axis component of current 13. In particular, the difference between the desired value for the quadrature-axis component of current IQ* and the quadrature-axis component of current IQ can first be generated in a node point 14, and this difference is then supplied to the regulator for the quadrature-axis component of current 13. From the desired value for the quadrature-axis component of current IQ* and the quadrature-axis component of current IQ, the regulator for the quadrature-axis component of current 13 determines a desired value for the quadrature-axis component of voltage UQ*. The desired value for the quadrature-axis component of current IQ* may be known in advance to the control device 4, and may uniformly have the value zero. Alternatively, the desired value for the quadrature-axis component of current IQ* may be supplied to the control device 4 from outside or derived from the desired speed value v* by the control device 4. As a further alternative, a desired acceleration value a* may be supplied to the control device 4 in addition to the desired speed value v*. Here, the control device 4 determines the desired value for the quadrature-axis component of current IQ* in a further determination block 12 based on the desired acceleration value a* in a manner which is known per se. The specification of the desired acceleration value a* occurs in the control clock cycle if applicable.

Similarly, the control device 4 supplies a desired value for the direct-axis component of current ID* and the direct-axis component of current ID to a regulator for the direct-axis component of current 15. In particular, the difference between desired value for the direct-axis component of current ID* and direct-axis component of current ID can first be generated in a node point 16, and this difference supplied to the regulator for the direct-axis component of current 15. From the desired value for the direct-axis component of current ID* and the direct-axis component of current ID, the regulator for the direct-axis component of current 15 determines a desired value for the direct-axis component of voltage UD*. The desired value for the direct-axis component of current ID* can be defined as required.

The regulator for the quadrature-axis component of current 13 can be designed as required, e.g., as a Proportional Integral (PI). Similarly, the regulator for the direct-axis component of current 15 can also be designed as required, e.g. as a PI controller. The regulator for the quadrature-axis component of current 13 and the regulator for the direct-axis component of current 15 are normally of the same design and parameterized in the same way.

Based on the desired value for the direct-axis component of voltage UD*, the desired value for the quadrature-axis component of voltage UQ*, and the commutation angle c, the control device 4 determines characteristic data for voltages UR*, US*, UT* of a three-phase voltage system. The voltages UR*, US*, UT* are the voltages to be output by the converter 3 to the segment 2.

For the purpose of determining the characteristic data, the desired value for the direct-axis component of voltage UD* and the desired value for the quadrature-axis component of voltage UQ* are supplied to a further node point 17. Before being supplied to the node point 17, the desired value for the quadrature-axis component of voltage UQ* is multiplied by the imaginary unit j. The output signal of the node point 17 is therefore a complex variable, whose real part corresponds to the desired value for the direct-axis component of voltage UD* and whose imaginary part corresponds to the desired value for the quadrature-axis component of voltage UQ* (voltage space vector). The complex variable determined in the node point 17 is supplied to a multiplier 18. The complex variable $e^{jc}$ is also supplied to the multiplier 18. The multiplier 18 performs the (complex) multiplication. The result of the complex multiplication is a further complex variable, whose real and imaginary parts correspond to orthogonal voltage components UA*, UB*. However, they no longer relate to the secondary part 11 but relates, instead to the segment 2. This conversion likewise is generally known and familiar to a person skilled in the art.

The voltage components UA*, UB* are already characteristic of the voltages UR*, US*, UT* that must be output by the converter 3 to the segment 2. It is therefore possible for the control device 4 to specify the voltage components UA*, UB to the converter 3.

However, other characteristic data can also be specified. In particular, via a determination block 19, the control device 4 can effect a conversion of the voltage components UA*, UB* in terms of magnitude and phase position φ of the voltage U* to be output. This data is also characteristic of the voltages UR*, US*, UT* output to the segment 2 by the converter 3. It is also possible for the control device 4 directly to determine the voltages UR*, US*, UT* itself and specify them to the converter 3. These two conversions are also generally known and familiar to a person skilled in the art.

The characteristic data. i.e., either the voltage components UA*, UB*, the magnitude and phase position φ of the voltage U*, or the actual voltages UR*, US*, UT*, is specified to the converter 3 by the control device 4. The specification of the characteristic data to the converter 3 occurs in the current-regulator clock cycle.

The procedure explained above in connection with FIG. 2 is itself known to a person skilled in the art. In the context of regulated operation, the desired value for the quadrature-axis component of current IQ* is precisely specified such that the secondary part 11 is moved. The desired value for the quadrature-axis component of current IQ* is specified such that a desired acceleration, i.e., the desired acceleration value a*, is achieved. In the context of controlled operation, the desired acceleration value a* is normally fixed at the value 0 or is precontrolled according to a predefined function. With respect to the desired value for the direct-axis component of voltage ID*, this is usually adequate if it is specified so as to be sufficiently large and then maintained at a constant level. The specification of the desired value for the quadrature-axis component of current IQ* can take place explicitly. Alternatively, the desired value for the quadrature-axis component of current IQ* may be defined by the desired acceleration value a* or by the operating mode "controlled operation" itself.

Figure 3:
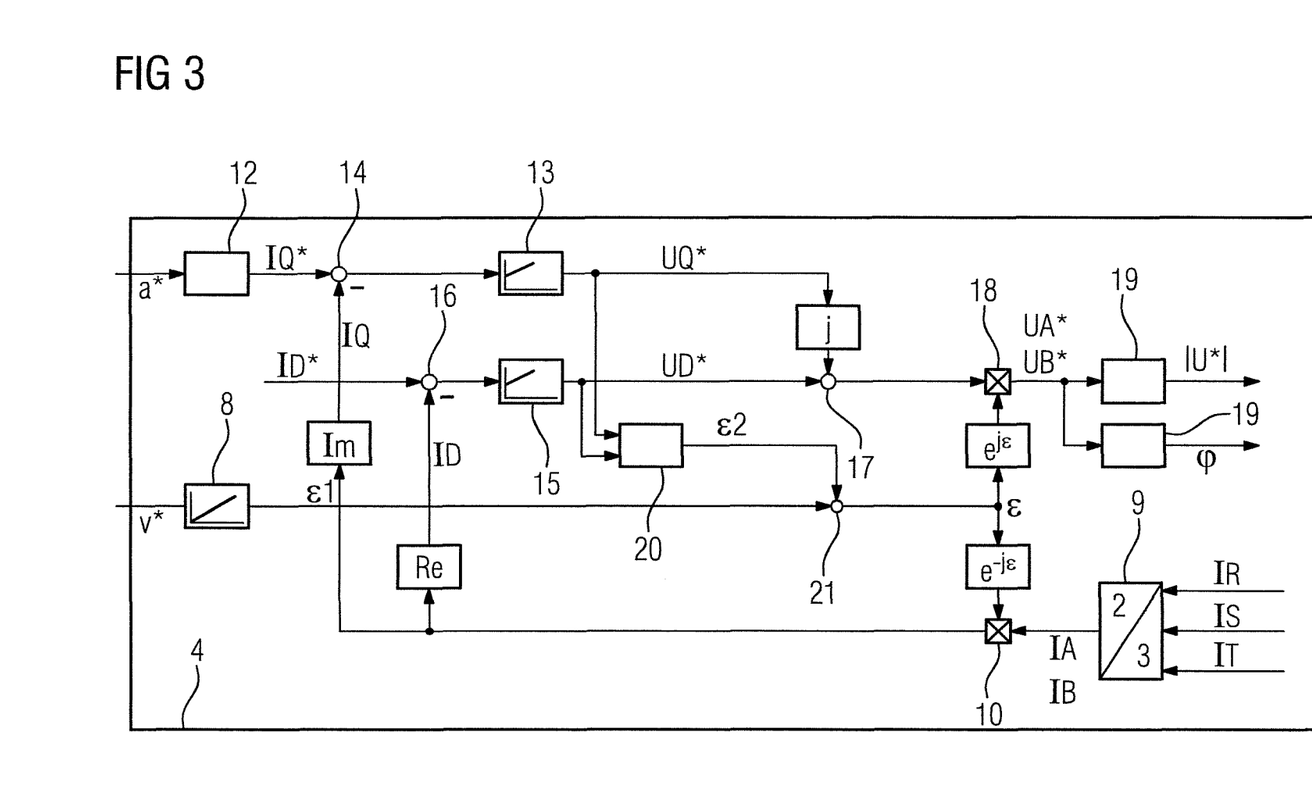
FIG. 3 schematically shows a modification of the control device from FIG. 2.

In terms of approach, FIG. 3 shows the same components as FIG. 2. However, provision is additionally made for a vibration damping block 20 and a node point 21. As shown in FIG. 3, the desired value for the direct-axis component of voltage UD* and/or the desired value for the quadrature-axis component of voltage UQ* are supplied to the vibration damping block 20. The control device 4 determines a damping commutation angle $\epsilon 2$ via the vibration damping block 20. The damping commutation angle $\epsilon 2$ is determined so as to counteract a mechanical vibration of the secondary part 11, where the mechanical vibration is superimposed on the desired movement of the secondary part 11. The desired movement of the secondary part 12 is defined by the desired speed value v*. The control device 4 generates the sum of the basic commutation angle $\epsilon 1$ and the damping commutation angle $\epsilon 2$ in the node point 21. The result of the summation corresponds to the commutation angle $\epsilon$.

Figure 4:
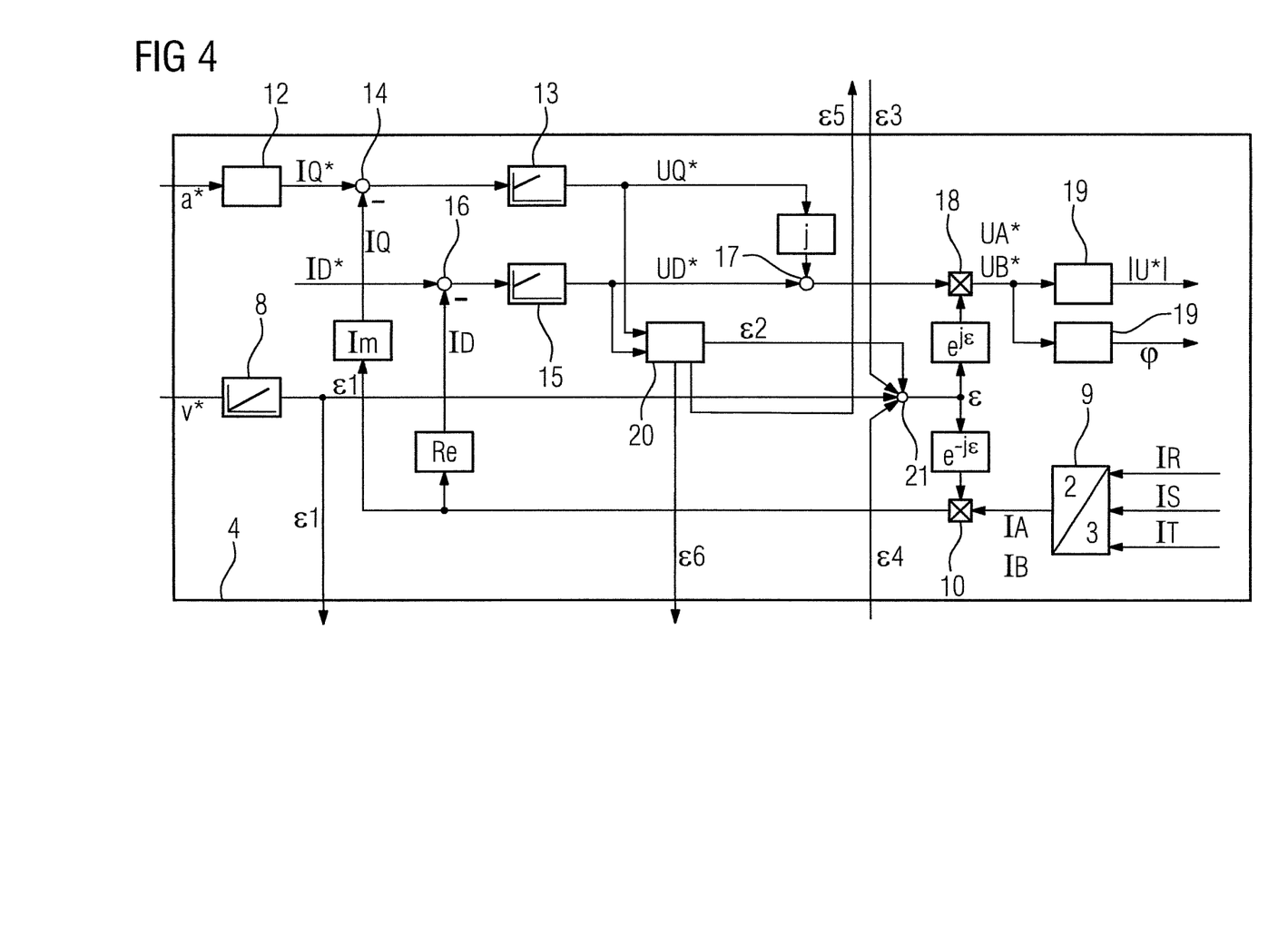
FIG. 4 schematically shows a modification of the control device from FIG. 3.

In terms of approach, FIG. 4 shows the same components as FIG. 3. However, a first correction value $\epsilon 3$ and/or a second correction value $\epsilon 4$ are additionally supplied to the node point 21. As before, the sum of the values $\epsilon 1$ and $\epsilon 2$ and at least one of the correction values $\epsilon 3$, $\epsilon 4$ supplied to the node point 21 is generated in the node point 21. As before, the result of the summation corresponds to the commutation angle $\epsilon$.

The control device 4 (see exemplary illustration in FIG. 1 for one of the control devices 4) receives the first correction value $\epsilon 3$ from that control device 4 which controls the preceding segment 2. The control device 4 (see exemplary illustration in FIG. 1 for the same control device 4) receives the second correction value $\epsilon 4$ from that control device 4 which controls the succeeding segment 2. These two control devices 4 are subsequently referred to as preceding control device 4 and succeeding control device 4. It is possible for the control device 4 to receive both correction values $\epsilon 3$, $\epsilon 4$ simultaneously. In many cases, however, the control device 4 only receives one of the two correction values $\epsilon 3$, $\epsilon 4$.

If the control device 4 providing the respective correction value $\epsilon 3$, $\epsilon 4$ and the control device 4 receiving the respective correction value $\epsilon 3$, $\epsilon 4$ are in a physical sense the same control device 4, no physical transmission is required. Only corresponding access to the already available respective correction value $\epsilon 3$, $\epsilon 4$ is required. Here, the respective correction value $\epsilon 3$, $\epsilon 4$ can be used immediately in the current-regulator clock cycle. Otherwise, if an actual transmission from one control device 4 to another control device 4 is necessary, then the respective control device 4 receives the correction values $\epsilon 3$, $\epsilon 4$ in a communication clock cycle. The communication clock cycle is ideally identical to the current-regulator clock cycle. Alternatively, the communication clock cycle may be a whole-number multiple of the current-regulator clock cycle. If the current-regulator clock cycle is 62.5 µs, for example, the communication clock cycle can be 62.5 µs, 125 µs, 250 µs or 500 µs, for example. However, the communication clock cycle is preferably shorter than the control clock cycle.

The control device 4 moreover determines a first correction variable $\epsilon 5$ via the vibration damping block 20. The control device 4 transmits the first correction variable $\epsilon 5$ to the preceding control device 4. Alternatively or additionally, the control device 4 determines a second correction variable $\epsilon 6$ via the vibration damping block 20. The control device 4 transmits the second correction variable $\epsilon 6$ to the succeeding control device 4. It is possible for the control device 4 to determine and transmit both correction variables $\epsilon 5$, $\epsilon 6$ simultaneously. In many cases, however, the control device 4 determines and transmits only one of the two correction variables $\epsilon 5$, $\epsilon 6$. The transmission of the correction variables $\epsilon 5$, $\epsilon 6$ occurs in the communication clock cycle. They are taken into consideration as first or second correction value $\epsilon 3$, $\epsilon 4$ respectively by the control device 4 to which the respective correction variable $\epsilon 5$, $\epsilon 6$ was transmitted.

Figure 5:
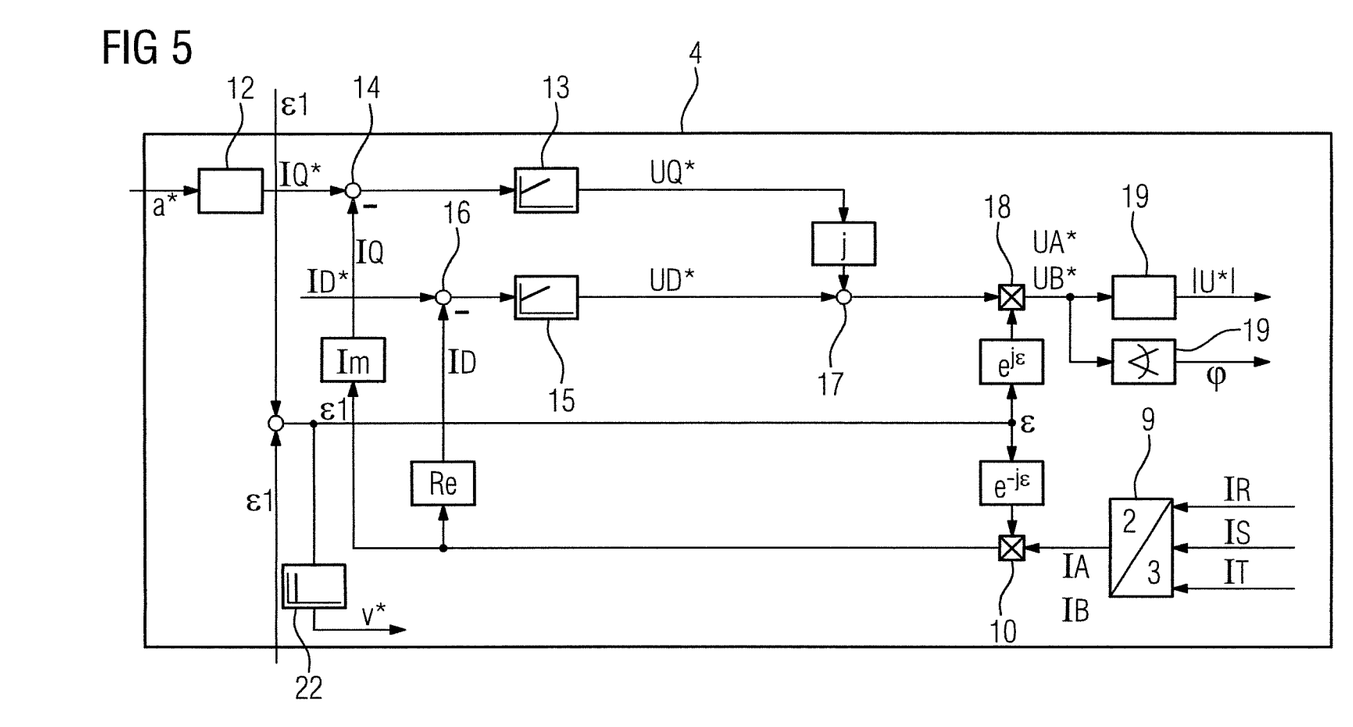
FIG. 5 schematically shows a modification of the control device from FIG. 2.

FIG. 5 shows a possible alternative embodiment of the control device 4 from FIG. 2. The presently contemplated embodiment can also be realized in a similar manner in the control devices 4 according to FIGS. 3 and 4. With respect to FIG. 5, the desired speed value v* is not specified to the control device 4. The control device 4 is therefore unable to update the basic commutation angle $\epsilon 1$ based on the desired speed value v*. In the case of the embodiment depicted in FIG. 5, the basic commutation angle $\epsilon 1$ is, however, specified directly to the control device 4, specifically by either the preceding control device 4 or the succeeding control device 4. The control device 4 receives the basic commutation angle $\epsilon 1$ from the preceding or succeeding control device 4. The transmission of the basic commutation angle $\epsilon 1$ occurs in the communication clock cycle. As illustrated below in connection with FIG. 6, a differentiator 22 may be provided if necessary, allowing the control device 4 to derive the desired speed value v* from the received basic commutation angle $\epsilon 1$.

Figure 6:
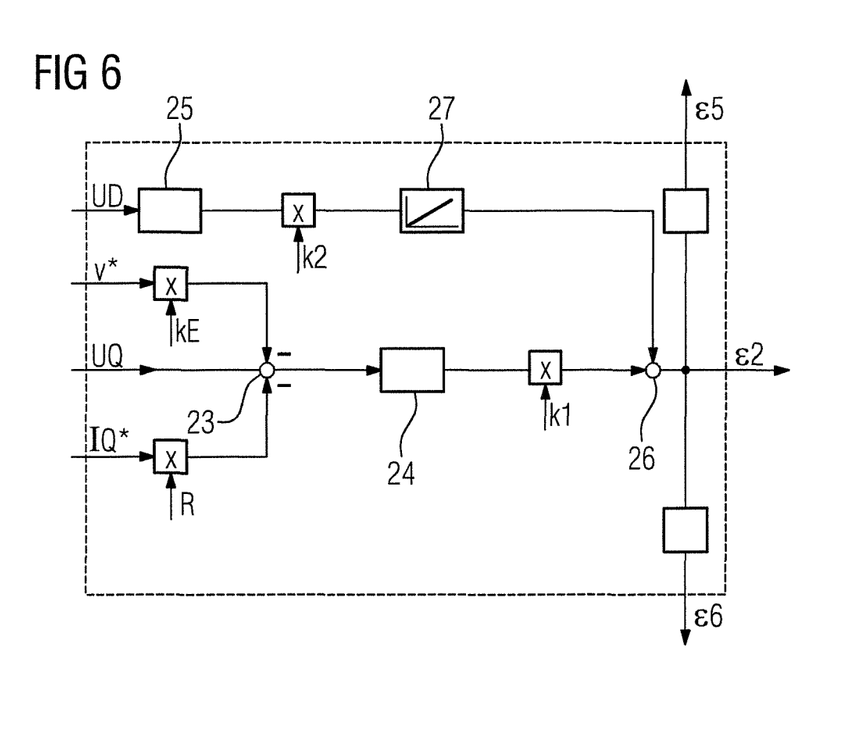
FIG. 6 schematically shows a vibration damping block.

FIG. 6 shows a possible currently preferred embodiment of the vibration damping block 20. With reference to FIG. 6, in addition to the desired value for the direct-axis component of voltage UD* and the desired value for the quadrature-axis component of voltage UQ*, the desired speed value v* is supplied to the vibration damping block 20. If the control device 4 does not receive the desired speed value v*, but is supplied directly with the basic commutation angle $\epsilon 1$ in accordance with the embodiment shown in FIG. 5, the desired speed value v* is that derived by means of the differentiator 22. In the case of the embodiment shown in FIG. 6, the vibration damping block 20 takes the desired speed value v* into consideration when determining the damping commutation angle $\epsilon 2$ and the first and/or second correction variable $\epsilon 5$, $66$. For example, the desired speed value v* can be weighted by a characteristic variable kE as per the illustration in FIG. 6, and the result of the weighting subtracted from the desired value for the quadrature-axis component of voltage UQ* in a node point 23. The characteristic variable kE may be defined by electrical characteristic variables of the corresponding segment 2.

Alternatively or preferably additionally, the desired value for the quadrature-axis component of current IQ* may be supplied to the vibration damping block 20. Here, the vibration damping block 20 takes the desired value for the quadrature-axis component of current IQ* into consideration when determining the damping commutation angle $\epsilon 2$ and the first and/or the second correction variable $\epsilon 5$, $\epsilon 6$. For example, the desired value for the quadrature-axis component of current IQ* can be weighted by a further characteristic variable R as per the illustration in FIG. 6, and the result of the weighting subtracted from the desired value for the quadrature-axis component of voltage UQ* in the node point 23. The further characteristic variable R may be defined by, and in particular correspond to, the winding resistance of the corresponding segment 2, for example.

At the same time, FIG. 6 shows further preferred embodiments of the vibration damping block 20. In particular, the vibration damping block 20 shown in FIG. 6 comprises a first and a second filter 24, 25. The filters 24, 25 may be band-pass filters, for example. The desired value for the quadrature-axis component of voltage UQ* is supplied to the first filter 24. In accordance with the illustration in FIG. 6, the desired value for the quadrature-axis component of voltage UQ* may be corrected, in particular beforehand in the node point 23, by a degree that is dependent on the desired speed value v* and/or on the desired value for the quadrature-axis component of current IQ*. The output signal of the first filter 24 is multiplied by a first coefficient k1 and then supplied to a node point 26. The desired value for the direct-axis component of voltage UD* is supplied to the second filter 25. The output signal of the second filter 25 is multiplied by a second coefficient k2 and then supplied to an integrator 27. As an alternative to multiplication by the coefficient k2, multiplication by the value k2/v* is also possible. Here, the desired value for the direct-axis component of voltage UD* is therefore not only weighted by the second coefficient k2, but is also divided by the desired speed value v*. The output signal of the integrator 27 is supplied to the node point 26. The sum of the variables supplied to the node point 26 is generated in the node point 26. The output signal of the node point 26 corresponds to the damping commutation angle $\epsilon 2$.

Figure 7:
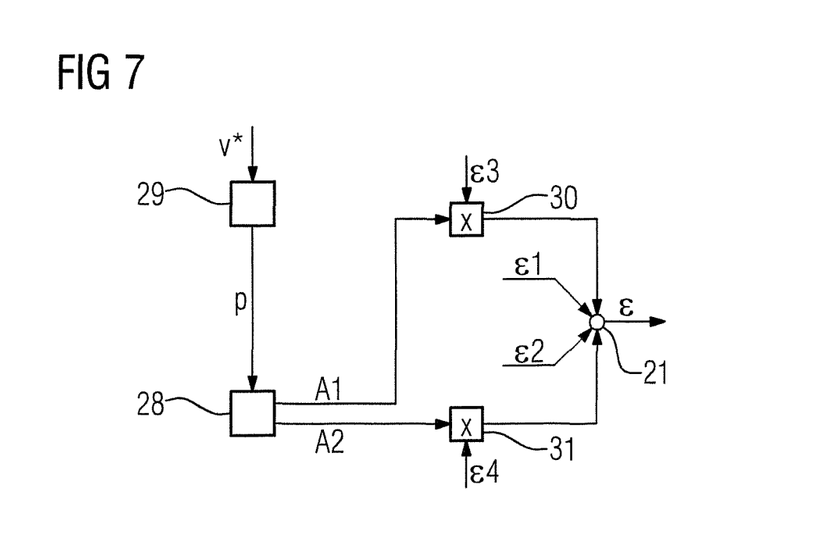
FIG. 7 schematically shows parts of a control device.

FIG. 7 shows a further preferred embodiment of the control device 4 in accordance with the invention. The presently contemplated embodiment can be combined with the embodiments shown in FIG. 4 and/or FIG. 6 if required, and also combined with the embodiment shown in FIG. 5.

With reference to FIG. 7, the control device 4 has a determination block 28. A position signal p is supplied to the determination block 28. The position signal p may be determined from the desired speed value v* by the control device 4 in a further determination block 29, for example. Alternatively the position signal p may be specified to the control device 4 by, e.g., a supervisory control device which is not shown in FIG. 7.

Based on the position signal p, within the determination block 28, the control device 4 can determine a first degree A1, to which the secondary part 11 when partially situated in the segment 2 controlled by the control device 4 is simultaneously also situated in the preceding segment 2. The first degree A1 therefore has the value 1 if the corresponding secondary part 11 is still situated entirely in the preceding segment 2, but is just at the boundary of the segment 2 controlled by the control device 4. As the secondary part 11 moves forwards, the first degree A1 assumes ever-lower values. The first degree A1 assumes the value 0 when the corresponding secondary part 11 is just situated entirely in the segment 2 controlled by the control device 4, but is just at the boundary to the preceding segment 2. The control device 4 supplies the determined first degree A1 to a multiplier 30. In the multiplier 30, the first correction value $\epsilon 3$ is multiplied or weighted by the first degree A1. The result of the multiplication is supplied to the node point 21.

In a similar manner, based on the position signal p, within the determination block 28, the control device 4 can determine a second degree A2, to which a further secondary part 11' (see FIG. 1) when partially situated in the segment 2 controlled by the control device 4 is simultaneously situated in the succeeding segment 2. The second degree A2 therefore has the value 0 if the corresponding secondary part 11' is still situated entirely in the segment 2 controlled by the control device 4, but is just at the boundary to the succeeding segment 2. As the secondary part 11' moves forwards, the second degree A2 assumes ever-higher values. The second degree A2 assumes the value 1 when the corresponding secondary part 11' is just situated entirely in the succeeding segment 2, but is just at the boundary to the segment 2 controlled by the control device 4. The control device 4 supplies the determined second degree A2 to a multiplier 31. In the multiplier 31, the second correction value $\epsilon 4$ is multiplied or weighted by the second degree A2. The result of the multiplication is supplied to the node point 21.

Figure 8:
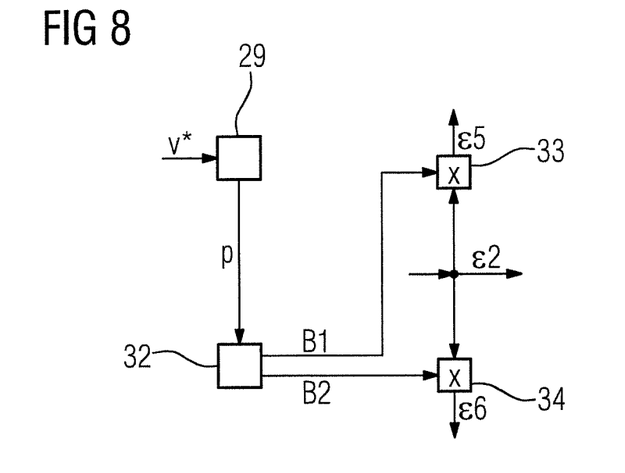
FIG. 8 schematically shows parts of a control device.

As an alternative to the embodiment in FIG. 7, FIG. 8 shows a further embodiment of the control device in accordance with the invention. The presently contemplated embodiment can likewise be combined with the embodiments shown in FIG. 4 and/or FIG. 6 if required, including the embodiment shown in FIG. 5 if applicable. In the case of the embodiment of FIG. 8, the determination block 28 is replaced by a determination block 32. In a similar manner to the embodiment in FIG. 7, the position signal p is supplied to the determination block 32. In a similar manner to FIG. 7, the position signal p can be determined by the control device 4 or specified to the control device 4.

With the determination block 32, the control device 4 determines a first degree B1, to which the secondary part 11 insofar as it is partially situated in the preceding segment 2 is simultaneously also situated in the segment 2 controlled by the control device 4. The first degree B1 therefore has the value 0 if the corresponding secondary part 11 is still situated entirely in the preceding segment 2, but is just at the boundary of the segment 2 controlled by the control device 4. As the secondary part 11 moves forwards, the first degree B1 assumes ever-higher values. The first degree B1 assumes the value 1 when the corresponding secondary part 11 is just situated entirely in the segment 2 controlled by the control device 4, but is just at the boundary to the preceding segment 2. The control device 4 supplies the determined first degree B1 to a multiplier 33. In the multiplier 33, the first correction variable $\epsilon 5$ is multiplied or weighted by the first degree B1. The result of the multiplication is output to the preceding control device 4.

In a similar manner, based on the position signal p, within the determination block 32, the control device 4 can determine a second degree B2, to which a further secondary part 11' when partially situated in the succeeding segment 2 is simultaneously situated in the segment 2 controlled by the control device 4. The second degree B2 therefore has the value 1 if the corresponding secondary part 11' is still situated entirely in the segment 2 controlled by the control device 4, but is just at the boundary to the succeeding segment 2. As the secondary part 11' moves forwards, the second degree B2 assumes ever-lower values. The second degree B2 assumes the value 0 when the corresponding secondary part 11' is just situated entirely in the succeeding segment 2, but is just at the boundary to the segment 2 controlled by the control device 4. The control device 4 supplies the determined second degree B2 to a multiplier 34. In the multiplier 34 the second correction variable $\epsilon 6$ is multiplied or weighted by the second degree B2. The result of the multiplication is output to the succeeding control device 4.

The linear drive can be used as necessary. In particular, the linear drive can be used for transporting and positioning work carriers or conveyor elements. In sum, the present disclosed embodiments of the invention therefore relate to the following:

Segments 2 of a primary part 1 of a linear drive are connected by converters 3 to a supply voltage U, and therefore receive currents IR, IS, IT of a three-phase system. Control devices 4 of the converters 3 update a basic commutation angle ε1 based on a desired speed value v*. Based on the currents IR, IS, IT and a commutation angle c, they determine a direct-axis component of current ID and a quadrature-axis component of current IQ that relate to a secondary part 11, 11' of the linear drive. The control devices 4 supply a desired value for the quadrature-axis component of current IQ* and the quadrature-axis component of current IQ to a regulator for the quadrature-axis component of current 13, which determines a desired value for the quadrature-axis component of voltage UQ* therefrom. They also supply a desired value for the direct-axis component of current ID* and the direct-axis component of current ID to a regulator for the direct-axis component of current 15, which determines a desired value for the direct-axis component of voltage UD* therefrom. Based on the desired value for the direct-axis component of voltage UD*, the desired value for the quadrature-axis component of voltage UQ*, and the commutation angle c, they determine characteristic data in respect of voltages UR*, US*, UT* of a three-phase voltage system that are to be output by the converters 3 to the segments 2. The commutation angle ε is the sum of basic commutation angle ε1 and damping commutation angle ε2 plus a first and/or second correction value ε3, ε4. The damping commutation angle ε2 is determined using at least the desired value for the direct-axis component of voltage UD* and/or the desired value for the quadrature-axis component of voltage UQ*. The control device 4 receives the first/second correction value ε3, ε4 from the preceding/succeeding control device 4. The control device 4 determines a first/second correction variable ε5, ε6, which it transmits to the preceding/succeeding control device 4.

Figure 9:
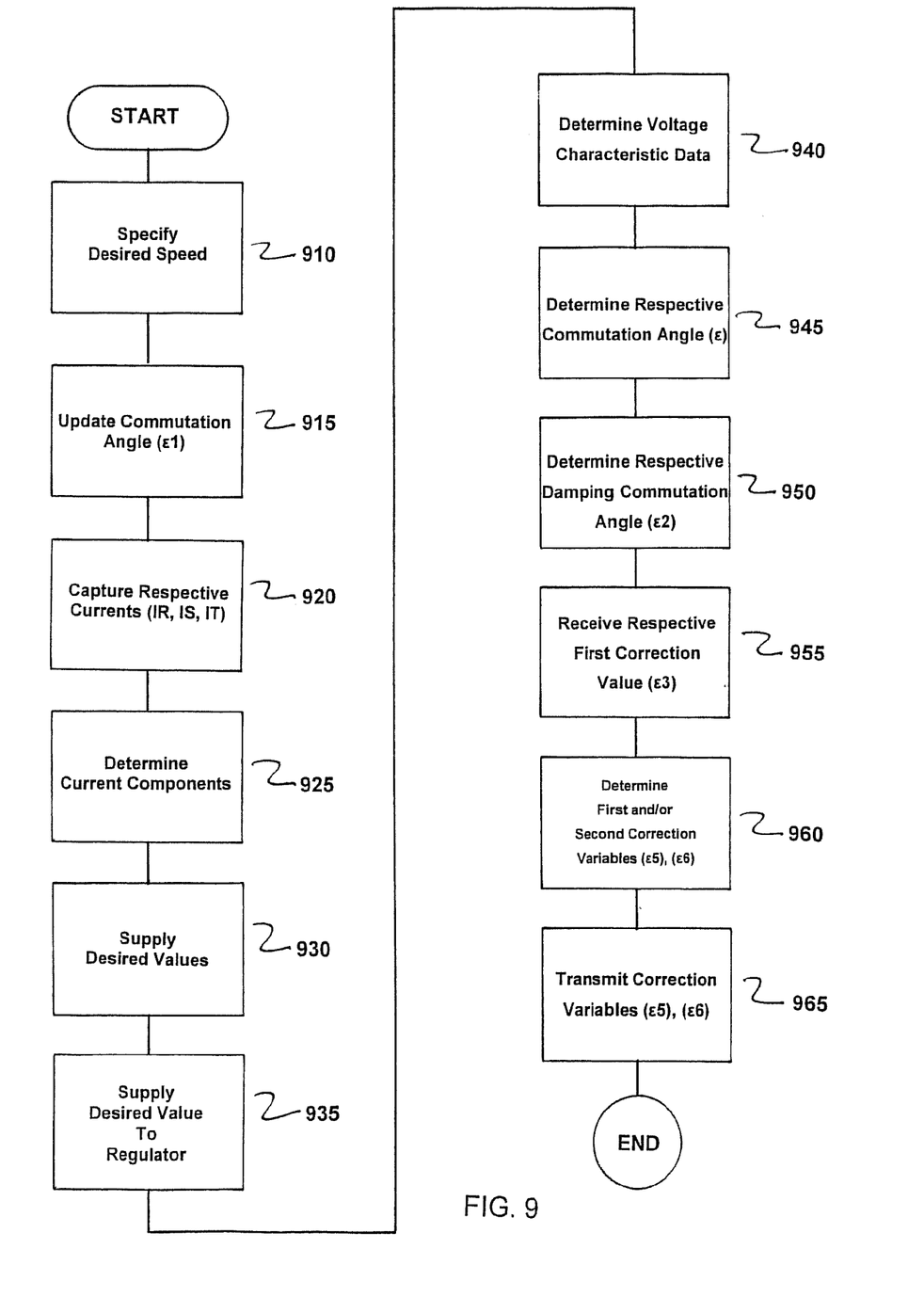
FIG. 9 is a flowchart of the method in accordance with the invention.

FIG. 9 is a flowchart of a control method for a primary part (1) of a linear drive, where the primary part (1) includes a plurality of sequentially consecutive segments (2) which are each connected to a supply voltage (U) via a respective converter (3), such that each of plurality of sequentially consecutive the segments (2) receive respective currents (IR, IS, IT) of a three-phase system. The method comprises specifying a respective desired speed value (v*) to a respective control device (4) which controls the respective converter (3), as indicated in step 910.

Next, a respective basic commutation angle (β1) is updated by the respective control device (4) based on the respective desired speed value (v*), as indicated in step 915.

The respective currents (IR, IS, IT) are now captured and supplied to the respective control device (4), as indicated in step 920.

A respective direct-axis component of current (ID) and a respective quadrature-axis component of current (IQ) are determined by the respective control device (4) based on the respective currents (IR, IS, IT) and a respective commutation angle (ε), as indicated in step 925. Here, the respective direct-axis component of current (ID) and the respective quadrature-axis component of current (IQ) relate to a secondary part (11, 11') of the linear drive.

Next, a respective desired value for the quadrature-axis component of current (IQ*) and the respective quadrature-axis component of current (IQ) is supplied by the respective control device (4) to a respective regulator for the quadrature-axis component of current (13), as indicated in step 930. Here, the respective regulator for the quadrature-axis component of current (13) determines a respective desired value for the quadrature-axis component of voltage (UQ*) from the respective desired value for the quadrature-axis component of current (IQ*) and the respective quadrature-axis component of current (IQ).

A respective desired value for the direct-axis component of current (ID*) and the respective direct-axis component of current (ID) is now supplied by the respective control device (4) to a respective regulator for the direct-axis component of current (15), as indicated in step 935. Here, a respective regulator for the direct-axis component of current (15) determining a respective desired value for the direct-axis component of voltage (UD*) from the respective desired value for the direct-axis component of current (ID*) and the respective direct-axis component of current (ID).

Next, characteristic data with respect to voltages (UR*, US*, UT*) of a three-phase voltage system which are to be output by the respective converter (3) to the respective segment (2) is determined by the respective control device (4), based on the respective desired value for the direct-axis component of voltage (UD*), the respective desired value for the quadrature-axis component of voltage (UQ*) and the respective commutation angle (ε), and the determined characteristic data is specified to the respective converter (3), as indicated in step 940.

Next, the respective commutation angle (ε) is determined by the respective control device (4) as a sum of the respective basic commutation angle (ε1) and a respective damping commutation angle (ε2) plus at least one of (i) a respective first correction value (ε3) and (ii) a respective second correction value (ε4), as indicated in step 945.

The respective damping commutation angle (ε2) is now determined by the respective control device (4) via a respective vibration damping block (20) to which at least one of (i) at least the respective desired value for the direct-axis component of voltage (UD*) and (ii) the respective desired value for the quadrature-axis component of voltage (UQ*) are supplied, as indicate in step 950.

Next, the respective first correction value (ε3) is received by the respective control device (4) from the control device (4) which controls at least one of (i) the currently preceding segment (2) and (ii) the respective second correction value (ε4) from the control device (4) which controls the currently succeeding segment (2), as indicated in step 955.

Next, at least one of (i) a first correction variable (ε5) and (ii) a second correction variable (ε6) are determined by the respective control device (4) via the respective vibration damping block (20), as indicated in step 960.

At least one of (i) the respective first correction variable (ε5) is now transmitted by the respective control device (4) to at least one of (i) the control device (4) which controls the currently preceding segment (2) and (ii) the respective second correction variable (ε6) is now transmitted to the control device (4) which controls the currently succeeding segment (2), as indicated in step 965.

The contemplated embodiments of the present invention have many advantages. In particular, vibration-free operation of the linear drive can easily be realized even if entire trains of carriers have to be moved and controlled operation is therefore essential. The procedures in accordance with the disclosed embodiments of the invention can readily be implemented as upgrades to existing control devices 4 by adapting the operating software in a corresponding manner.

Although the invention is illustrated and described in detail above with reference to the exemplary embodiment, the invention is not restricted by the examples disclosed herein, and other variations may be derived therefrom by a person skilled in the art without thereby departing from the scope of the invention.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A control method for a primary part of a linear drive, wherein the primary part includes a plurality of sequentially consecutive segments which are each connected to a supply voltage via a respective converter, such that each of plurality of sequentially consecutive the segments receive respective currents of a three-phase system, the method comprising:
specifying a respective desired speed value to a respective control device which controls the respective converter;
updating, by the respective control device, a respective basic commutation angle based on the respective desired speed value;
capturing and supplying the respective currents to the respective control device;
determining, by the respective control device, a respective direct-axis component of current and a respective quadrature-axis component of current based on the respective currents and a respective commutation angle, the respective direct-axis component of current and the respective quadrature-axis component of current relating to a secondary part of the linear drive;
supplying, by the respective control device, a respective desired value for the quadrature-axis component of current and the respective quadrature-axis component of current to a respective regulator for the quadrature-axis component of current, said respective regulator for the quadrature-axis component of current determining a respective desired value for the quadrature-axis component of voltage from the respective desired value for the quadrature-axis component of current and the respective quadrature-axis component of current;
supplying, by the respective control device, a respective desired value for the direct-axis component of current and the respective direct-axis component of current to a respective regulator for the direct-axis component of current, said a respective regulator for the direct-axis component of current determining a respective desired value for the direct-axis component of voltage from the respective desired value for the direct-axis component of current and the respective direct-axis component of current;
determining, by the respective control device, based on the respective desired value for the direct-axis component of voltage, the respective desired value for the quadrature-axis component of voltage and the respective commutation angle, characteristic data with respect to voltages of a three-phase voltage system which are to be output by the respective converter to the respective segment, and specifying said determined characteristic data to the respective converter;
determining, by the respective control device, the respective commutation angle as a sum of the respective basic commutation angle and a respective damping commutation angle plus at least one of (i) a respective first correction value and (ii) a respective second correction value;
determining, by the respective control device, the respective damping commutation angle via a respective vibration damping block to which at least one of (i) at least the respective desired value for the direct-axis component of voltage and (ii) the respective desired value for the quadrature-axis component of voltage are supplied;
receiving, by the respective control device, the respective first correction value from the control device which controls at least one of (i) the currently preceding segment and (ii) the respective second correction value from the control device which controls the currently succeeding segment;
determining, by the respective control device, at least one of (i) a first correction variable and (ii) a second correction variable via the respective vibration damping block; and
transmitting, by the respective control device, at least one of (i) the respective first correction variable to the control device which controls the currently preceding segment and (ii) the respective second correction variable to the control device which controls the currently succeeding segment.

2. The control method as claimed in claim 1, wherein the respective desired speed value is also supplied to the respective vibration damping block; and
wherein the respective vibration damping block takes the respective desired speed value into consideration when determining the respective damping commutation angle and at least one of (i) the respective first correction variable and (ii) the respective second correction variable.

3. The control method as claimed in claim 1, wherein the respective control device receives the respective currents in a current-regulator clock cycle and specifies the characteristic data, with respect to the voltages that are to be output by the respective converter to the respective segment, to the respective converter in the current-regulator clock cycle;
wherein the respective control device receives the correction values in a communication clock cycle and transmits the correction variables in the communication clock cycle; and
wherein the communication clock cycle is identical to the current-regulator clock cycle or is a whole-number multiple of the current-regulator clock cycle.

4. The control method as claimed in claim 2, wherein the respective control device receives the respective currents in a current-regulator clock cycle and specifies the characteristic data, with respect to the voltages that are to be output by the respective converter to the respective segment, to the respective converter in the current-regulator clock cycle;
wherein the respective control device receives the correction values in a communication clock cycle and transmits the correction variables in the communication clock cycle; and
wherein the communication clock cycle is identical to the current-regulator clock cycle or is a whole-number multiple of the current-regulator clock cycle.

5. The control method as claimed in claim 1, wherein instead of specifying the respective desired speed value and updating the basic commutation angle, the respective control device receives the basic commutation angle from one of (i)

the control device which controls the currently preceding segment and (ii) the control device which controls the currently succeeding segment.

6. The control method as claimed in claim 5, wherein the respective control device derives the respective desired speed value from the received basic commutation angle;

wherein the respective derived desired speed value is additionally supplied to the respective vibration damping block; and wherein the respective vibration damping block takes the respective desired speed value into consideration when determining the respective damping commutation angle and at least one of the respective first correction variable and the respective second correction variable.

7. The control method as claimed in claim 5, wherein the respective control device receives the respective currents in a current-regulator clock cycle and specifies the characteristic data, in respect of the voltages to be output by the respective converter to the respective segment, to the respective converter in the current-regulator clock cycle;

wherein the respective control device receives the basic commutation angle and the correction values in a communication clock cycle and transmits the correction variables in the communication clock cycle; and wherein the communication clock cycle is identical to the current-regulator clock cycle or is a whole-number multiple of the current-regulator clock cycle.

8. The control method as claimed in claim 6, wherein the respective control device receives the respective currents in a current-regulator clock cycle and specifies the characteristic data, in respect of the voltages to be output by the respective converter to the respective segment, to the respective converter in the current-regulator clock cycle;

wherein the respective control device receives the basic commutation angle and the correction values in a communication clock cycle and transmits the correction variables in the communication clock cycle; and wherein the communication clock cycle is identical to the current-regulator clock cycle or is a whole-number multiple of the current-regulator clock cycle.

9. The control method as claimed in claim 1, wherein the respective desired value for the quadrature-axis component of current is also supplied to the respective vibration damping block; and wherein the respective vibration damping block takes the respective desired value for the quadrature-axis component of current into consideration when determining the respective damping commutation angle and at least one of the respective first correction variable and (ii) the respective second correction variable.

10. The control method as claimed in claim 1, wherein at least one of:

(i) the respective control device determines a first degree, to which a secondary part of the linear drive, said secondary part being situated partially in the respective segment, is situated in the currently preceding segment, and weights the respective first correction value by the first degree before summing, and (ii) the respective control device determines a second degree, to which a secondary part of the linear drive, said secondary part being situated partially in the respective segment, is situated in the currently succeeding segment, and weights the respective second correction variable by the second degree before summing.

11. The control method as claimed in claim 1, wherein at least one of:

(i) the respective control device determines a first degree, to which a secondary part of the linear drive, said secondary part being situated partially in the preceding segment, is situated in the respective segment, and takes said first degree into consideration when determining the respective first correction variable; and (ii) the respective control device determines a second degree, to which a secondary part of the linear drive, said secondary part being situated partially in the succeeding segment, is situated in the respective segment, and takes said second degree into consideration when determining the respective second correction variable.

12. The control method as claimed in claim 1, wherein a respective desired acceleration value is also specified to the respective control device; and wherein the respective control device determines the respective desired value for the quadrature-axis component of current based on the respective desired acceleration value.

13. The control method as claimed in claim 1, wherein the method is implemented to transport and position work carriers or conveyor elements.

14. A non-transitory computer readable medium encoded with a computer program comprising machine code executable by a control device for a converter which, when executed by the control device, causes the control device to control the converter in accordance with a control method as claimed in claim 1.

15. A control device for a converter wherein the control device is programmed by the computer program as claimed in claim 14.

16. A linear drive, wherein a primary part of the linear drive includes a plurality of sequentially consecutive segments which are each connected to a supply voltage via a respective converter, such that each segments of the plurality of sequentially consecutive segments receive respective currents of a three-phase system;

wherein the converters are controlled by a respective control device, and wherein each control device is configured in accordance with claim 15.

* * * * *